(No Model.)
W. G. FAY.
COMBINED COASTING PEDAL AND LOCK FOR BICYCLES.
No. 491,342. Patented Feb. 7, 1893.
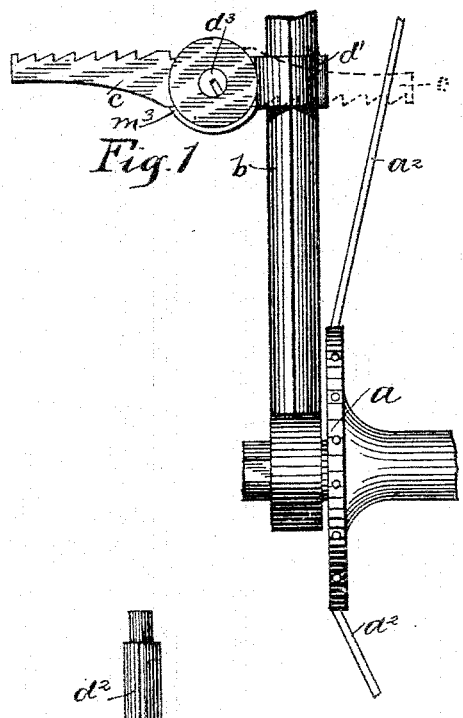
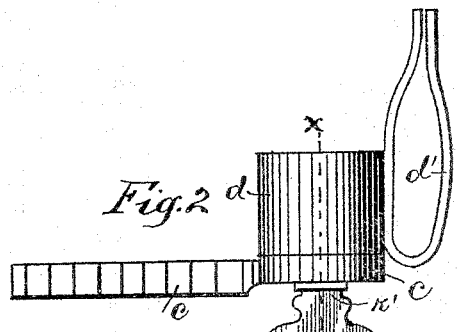
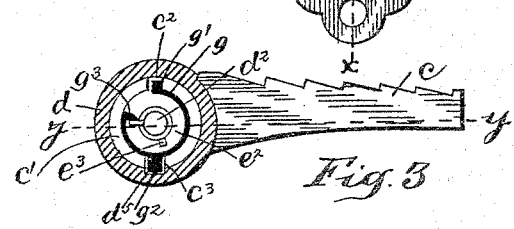
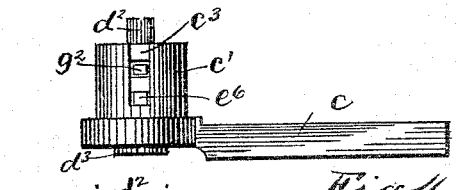
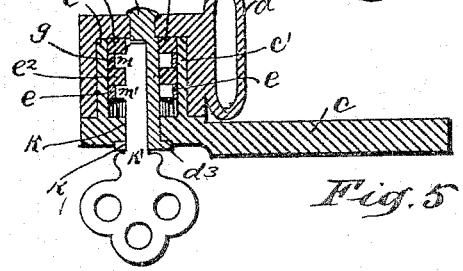
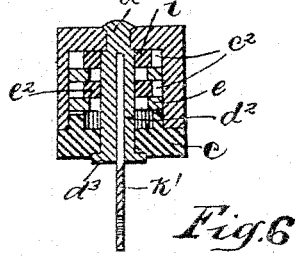
Witnesses
H. B. Bradshaw
J. S. Riley
Inventor
Waldo Guy Fay
By his Attorneys
Staley and Shepherd

UNITED STATES PATENT OFFICE.

WALDO GUY FAY, OF COLUMBUS, OHIO.

COMBINED COASTING-PEDAL AND LOCK FOR BICYCLES.

SPECIFICATION forming part of Letters Patent No. 491,342, dated February 7, 1893.

Application filed April 2, 1892. Serial No. 427,434. (No model.)

*To all whom it may concern:*

Be it known that I, WALDO GUY FAY, a citizen of the United States, residing at Columbus, in the county of Franklin and State of Ohio, have invented a certain new and useful Improvement in a Combined Coasting-Pedal and Lock for Bicycles, of which the following is a specification.

My invention relates to bicycle locks of that class which are adapted to lock the wheel against movement when the same is at rest.

The objects of my invention are to provide a simple and effective means of locking the front wheel of a bicycle against rotation; to obviate the use of the usual chain and padlock and to admit of the lock being operated in rapid and easy manner. These objects I accomplish in the manner illustrated in the accompanying drawings, in which Figure 1 is a view in elevation of the front hub of a bicycle showing a portion of one of the forks projecting therefrom, and showing my improved locking coasting pedal thereon. Fig. 2 is a plan view of said coasting pedal and locking attachment. Fig. 3 is a side view of the same showing the end of the cap which surrounds the lock broken away and showing the outer washer of said lock removed for the sake of clearness. Fig. 4 is a view in elevation of said coasting pedal and lock attachment with the cap or top casing removed. Fig. 5 is a sectional view on line $y\ y$ of Fig. 3, showing the key therein in the locked position. Fig. 6 is a sectional view on line $x\ x$ of Fig. 2 and Fig. 7 is a detail view in elevation of the post.

Similar letters refer to similar parts throughout the several views.

$a$ represents a bicycle wheel hub and $b$ a portion of one of the forks which rises therefrom in the usual manner.

$c$ represents the body of the coasting pedal which may be of the usual form. Within the inner end of this coasting pedal is formed a tubular projection $c'$ which projects laterally therefrom. The tubular portion $c'$ is provided as shown, with two oppositely located slotted openings or mortises $c^2$, $c^3$ which extend from the outer end thereof, to near the inner end of the tube. The tubular extension $c'$ with the locking parts which it contains as hereinafter described, is incased by a suitable cap $d$ which has formed therewith on one side a thin metallic projecting clamping strip $d'$ which is looped or doubled to embrace the fork portion $b$ as hereinafter described. The cap $d$ is retained in its position about the tubular extension $c'$ of the pedal and against the body of the latter at the base of said tubular extension, by means of a central lock post $d^2$ which passes through the end of said cap centrally and is riveted against the latter and which at its opposite end passes loosely through the inner end portion of the pedal $c$ and is provided with a flanged head which abuts against said pedal body as shown at $d^3$.

Surrounding the post $d^2$, at a distance therefrom and supported in contact with the inner wall of the tubular extension $c'$ is a spring-strip $e$ which as hereinafter prescribed for a second spring-strip $g$, forms substantially three-fourths of a circle. One end of this spring-strip is as shown at $e'$, bent outward to form an end lug which extends within and engages with the inner end of the mortise or slotted opening $c^2$ of the tubular extension $c'$. Diametrically opposite the end lug $e'$ the spring is provided with a projecting lug $e^6$. The remaining end of this spring is provided with a hook-shaped or inturned termination as hereinafter prescribed for said outer spring $g$. The lug $e^6$ normally projects through the slotted opening $c^3$ of the tubular extension $c'$ and engages in a vertical notch $d^5$ formed in the inner surface of the cap body $d$.

Surrounding the central key post and abutting against the outer edge of the spring $e$ is a washer or ring $e^2$ which is provided as shown at $e^3$ with a vertical notch in its inner face. On the outer side of this ring $e^2$ fits within the tubular extension $c'$ a second spring $g$ which is provided at one end with an outturned lug $g'$ which engages as prescribed for the lug $e'$ with the mortise or slotted opening $c^2$. This spring $g$ is as prescribed for the spring $e$, also provided with an outwardly projecting lug $g^2$ which corresponds with the lug $e^6$ of the spring $e$, said lug $g^2$ also engaging with the notch $d^5$ and passing through the slotted opening $c^3$. The remaining end of the spring $g$ is as shown in Fig. 3 of the drawings, provided with an inturned or hook-shaped termination $g^3$. Surrounding the post $d^2$ on the outer side of the spring $g$ is an outer ring or washer $i$, which for clearness is removed in Fig. 3 of the drawings.

The key-post $d^2$ is provided with a longitudinal channel or key-way $k$ which as shown, extends through the outer enlarged end of said post to a point adjacent to the outer end of the cap $d$ and which is of a depth preferably equal to one-half the diameter of said post.

$k'$ represents the key which I employ for operating the above described form of lock, the stem or blade of said key being provided on one of its edges with two projecting nibs $m\ m'$, the distance between which is equivalent to the thickness of the ring $e^2$. In inserting the key within the lock to operate the same, the stem of said key enters the key-way $k$ while the outer projecting nibs thereof, pass inward through the ring notch $e^3$. In its normal position the coasting pedal is extended in the usual manner at right-angles with the fork as shown in Fig. 1 of the drawings, the inner end of said pedal being supported horizontally by a suitable shoulder $m^3$ formed on the periphery of the cap body.

In attaching my improved locking pedal to the bicycle the bicycle fork is as shown, made to pass through the looped clamping strip $d'$ and the ends of said clamping strip riveted or otherwise secured together. The key having thus been inserted, it is turned until its nibs are in contact respectively with the inturned end $g^3$ of the spring $g$ and the corresponding end of the spring $e$, a further turning of said key and a consequent pressure of the nibs thereof, on said spring ends will result as will be seen in the withdrawal of the spring lugs $g^2$ and $e^6$ from the cap notch $d^5$ and a consequent disengagement of said spring lugs thereof. This disengagement of the spring grooves with the cap admits of the turning of the coasting pedal about the post $d^2$.

From the construction herein shown and described, it will be seen that when the coasting pedal is in its normal position, the locking parts thereof will be disengaged and that when it is desired to lock the front wheel against movement, said pedal may be turned inward to the position shown in dotted lines in Fig. 1 of the drawings, in which position the inner end portion of the pedal may be made to extend between the spokes of the wheel, and thus by contact with the spokes prevent any rotation of the wheel. It will also be seen that turning the pedal to the inwardly extended locking position, will result in causing an engagement of the lugs $g^2$ and $e^6$ with the notch $d^5$ and in a consequent locking of the pedal in this position. The construction shown and described, not only affords a neat, simple and efficient method of locking the wheel against movement, but is such as to admit of its attachment to the forks of any of the ordinary forms of bicycles and at the same time provide a coasting pedal for ordinary use.

It is evident that I may vary the construction of my lock by employing more or less of the rings or washers and springs thereof and providing the key stem with a corresponding number of properly located nibs.

Having now fully described my invention, what I claim and desire to secure by Letters Patent is,

1. In a combined bicycle lock, and coasting pedal the combination with the pedal $c$ and a lock mechanism carried by the inner end thereof, of a fork clamp within which said pedal is pivotally connected, said locking mechanism adapted to be so manipulated as to form a rigid connection between said clamp and pedal, substantially as and for the purpose specified.

2. In a combined coasting pedal, and bicycle lock the combination with the pedal $c$, a tubular extension $c'$ on the inner side thereof, a lock mechanism therein, a key-way therein, of a cap $d'$ pivoted on said tubular extension and a fork clamped on said cap, said cap and tubular extension being adapted to be rigidly connected by said lock mechanism, substantially as and for the purpose specified.

WALDO GUY FAY.

In presence of—
C. C. SHEPHERD,
GEO. B. FRAVEL.